Patented Aug. 16, 1932

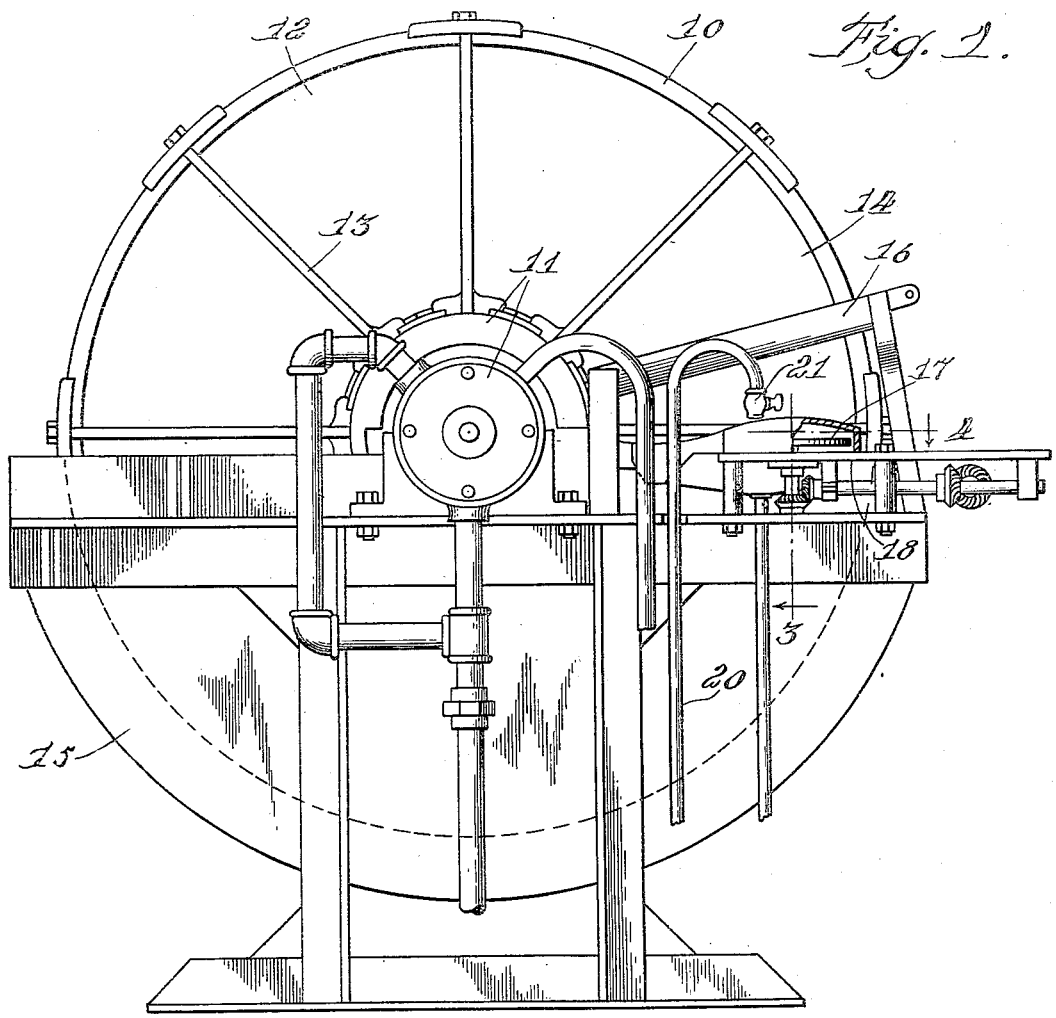

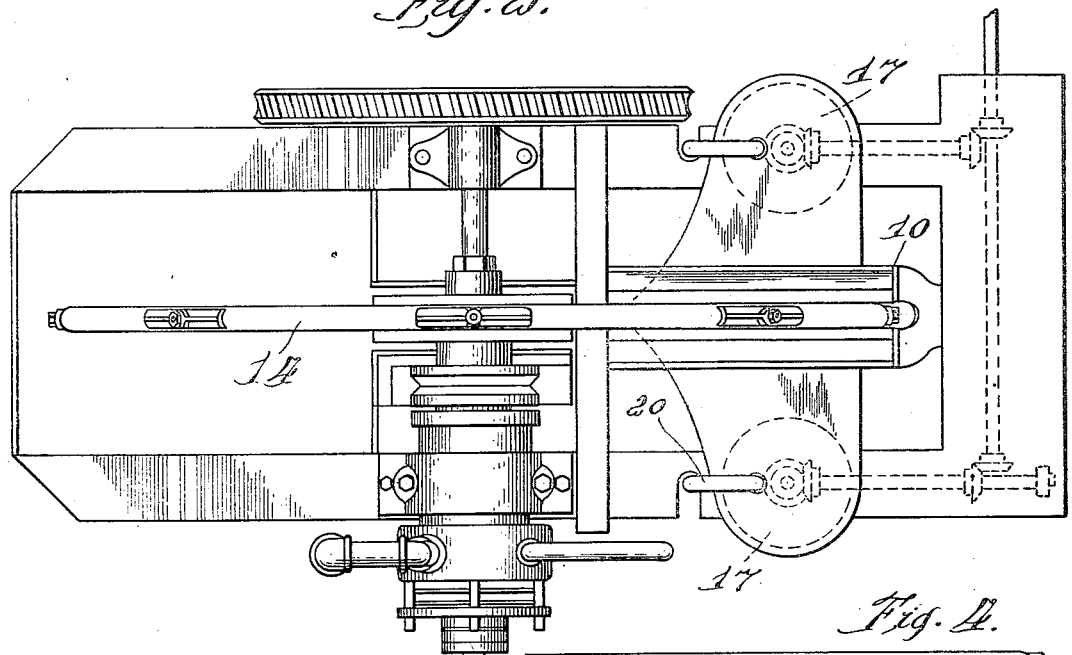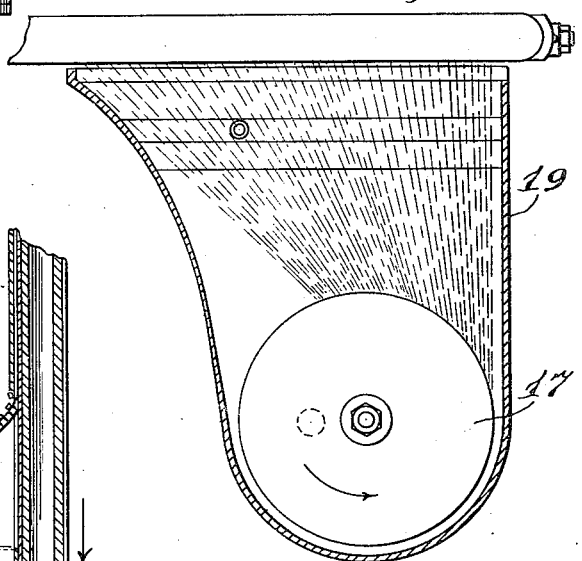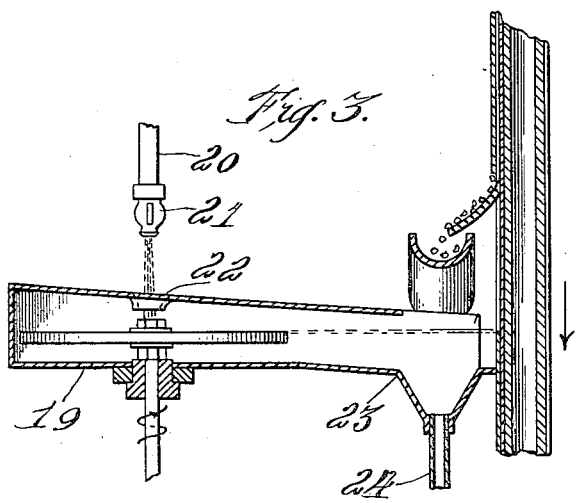

1,871,878

UNITED STATES PATENT OFFICE

SIDNEY E. CAHOON AND WILLIAM BACHELDOR, OF WOOD RIVER, ILLINOIS, ASSIGNORS TO STANDARD OIL COMPANY, OF WHITING, INDIANA, A CORPORATION OF INDIANA

PRECOATING DEVICE

Application filed September 9, 1929. Serial No. 391,321.

This invention relates to improvements in the removal of wax from hydrocarbon oils, and more particularly higher melting paraffin waxes from chilled viscous lubricating oils, or solutions thereof, by means of continuous rotating drum or disc filters.

One of the objects of the invention is to provide simple and effective means for distributing a precoating material in an even and uniform layer upon the surface of the rotating filter leaves or sectors so as to effect the ready removal of the waxy material which forms a cake upon the precoating layer during the filtering operation. Other objects and advantages will appear as the specification proceeds.

The invention is fully described in the following specification and shown in the accompanying drawings, in which—

Fig. 1 is a view, in elevation, of a continuous filtering device of the rotating disc type;

Fig. 2 is a top plan view of the apparatus;

Fig. 3 is an enlarged detailed sectional view, the section being taken as indicated at line 3 of Fig. 1; and Fig. 4 is an enlarged detailed sectional view, the section being taken as indicated at line 4 of Fig. 1.

Referring more particularly to the drawings, the numeral 10 indicates a filter disc or frame, mounted on the horizontal rotating drum 11. The filter disc 10 is of a common type, well known in the industry, being made up of sector-shaped sections or leaves 12 between the radial supporting members 13, there being a filter medium, either of textile or metal cloth 14, on each face of each section. The disc or frame 10 revolves in a container 15 of the usual type. A scraper or knife 16, of the usual type, is supported against the leaves of the filter so as to remove the cake formed thereupon.

As described more fully in co-pending application, Serial No. 375,147, filed July 1, 1929, it has been found highly desirable to precoat the surface of the leaves or filter sectors just before they enter the body of material to be filtered, with a thin, even layer of an inert finely divided, solid material, such as kieselguhr, filter clay, diatomaceous earth, infusorial earth such as "Super-Cel", or the like, in order to effect a ready removal of the wax cake which is subsequently formed upon the filter leaves. Considerable difficulty has been experienced in attempting to form an even, uniform layer of the precoating material upon the filter disc sectors or leaves, inasmuch as the outer edge surface of the sectors travels at a greater linear speed than the inner surface portion.

In order to secure an even distribution of the precoating material upon the filter surfaces, we have devised the following apparatus. A disc 17 is rotatably supported in a frame 18 adjacent the filter frame so as to revolve in a plane at substantially right angles to the surface of the leaves or sectors. The disc is preferably enclosed by a metal guard or spray guide 19 which extends forwardly to the surface of the filter leaf and is so shaped as to guide the spray from the disc in a horizontal sheet. The covering material, which is preferably carried in an oil medium or slurry, is pumped through pipe 20 and is discharged through valve-controlled nozzle 21 and through aperture 22, with which the guard 19 is provided, upon disc 17. The rotation of disc 17 causes the material thus discharged upon it to be thrown in a plane substantially at right angles to the surface of the filter leaves or sectors. By changing the point at which the slurry drops on the disc, i. e., placing this point closer or farther away from the center of the disc, the amount of precoating material going on the outer edge of the filter leaf per unit of area can be made substantially the same as that on the inner edge where there is less area to be covered.

Any excess slurry drops into the trough 23 underneath the disc and is returned by conduit 24 to the circulating pump (not shown). The pump returns the material to the disc for reuse.

As illustrated in Fig. 2, a rotating disc 17 is placed on each side of the filter frame 10 so as to precoat both surfaces of the filter leaves thereon. If more than one filter disc is employed, one of the distributor discs may be placed between adjacent filter discs and the points at which the slurry is dropped on the distributor disc could be so located that the slurry will be thrown off on both sides. One distributor or precoater disc, therefore, would precoat the adjacent surfaces of two of the filter discs, the guards, of course, being changed so as to guide the stream or droplets in the desired directions. In an installation of this kind, the slurry may be dropped at two points instead of one, in order to get the proper distribution of the slurry.

In the operation of the apparatus, the oil slurry is discharged at the proper point upon the rapidly rotating distributor disc 17 and is thrown in a sheet of droplets at substantially right angles to the surface of the filter leaves, so as to cover the leaves, as they rotate, with an even layer of precoating material. In practice, it has been found desirable to operate the distributor disc 17 at a speed of about 1500 revolutions per minute. The speed rate, however, will vary with various factors, such as thickness of the slurry, etc.

As the filter disc 10 is rotated, each sector is subjected, in succession, to a cycle of operations wherein it is first coated with a thin, even layer of precoating material; it then travels through the body of chilled wax-containing oils in the pan 15 while suction is applied to draw wax-free oil through the sectors of the filter and leave on each sector a wax-containing coating; and finally, the wax-containing coating is removed by scraping or other suitable means, pressure being used, instead of vacuum, during the wax-removal operation; the cycle being then repeated.

With the operation as described, there is no vapor mist or spray to be recirculated, and consequently very little naphtha loss or loss of light oil fractions. Also, there is no smearing of the cloth as may result from other methods which involve direct contact of the precoating member with the filter cloth. The apparatus gives a uniform and even layer of the precoating material over the entire filtering surfaces.

The foregoing detailed description has been given for clearness of understanding only, and no unnecessary limitations should be understood therefrom, but the appended claims should be construed as broadly as permissible, in view of the prior art.

We claim:

1. In combination a filter disk, a rotatable disk mounted adjacent one side of the filter disk, means for rotating the rotatable disk in such a direction that the periphery of the rotatable disk moves in a direction from the periphery of the filter disk toward the center thereof, and means for applying a slurry to said rotatable disk at a point between the center of said disk and the periphery thereof whereby a larger amount of slurry will be thrown toward the periphery of the filter disk than will be thrown toward the center portion thereof and means to direct the slurry toward the filter disk and to catch excess slurry which is thrown from the rotatable disk and which does not adhere to the filter disk.

2. In apparatus of the class described, a filter disk mounted to rotate in a substantially vertical plane, a distributor disk mounted to rotate in a substantially horizontal plane about a substantially vertical axis, means for rotating said distributor disk so that the periphery thereof moves in a direction from the periphery of the filter disk toward the center thereof, means for feeding a coating material on the distributor disk at an eccentric position adjusted so that the amount of coating substance thrown toward the periphery of the filter disk exceeds the amount thrown toward the center portions thereof, and a guard which is substantially straight between the distributor and the periphery of the filter disk and is flared on the other side toward the center of the filter disk.

3. In apparatus of the class described, a filter disk mounted to rotate in a substantially vertical plane, a distributor disk mounted to rotate in a substantially horizontal plane about a substantially vertical axis, means for rotating said distributor disk so that the periphery thereof moves in a direction from the periphery of the filter disk toward the center thereof, means for feeding a coating material on the distributor disk at an eccentric position adjusted so that the amount of coating substance thrown toward the periphery of the filter disk exceeds the amount thrown toward the center portions thereof, and means for directing more of the coating material against the periphery of the filter disk than is directed against the center thereof.

4. In apparatus of the class described, a filter disc mounted to rotate in a substantially vertical plane, a distributor disc mounted to rotate in a substantially horizontal plane adjacent thereto about a substantially vertical axis, means for applying a feed to said distributor disc at an eccentrically located point near to the faster moving periphery of the filter disc whereby the amount of coating substances thrown toward the periphery of the filter disc exceeds the amount thrown toward the center portions thereof, and means to direct the slurry towards the filter disc and to catch excess slurry which is thrown from the distributor disc and which does not adhere to the filter disc.

SIDNEY E. CAHOON.
WILLIAM BACHELDOR.